United States Patent
Díez Díez et al.

(10) Patent No.: US 10,746,156 B2
(45) Date of Patent: Aug. 18, 2020

(54) METHOD FOR DESIGNING LEADING EDGES AND SUPPORTING STRUCTURE PROVIDED WITH SAID EDGE

(71) Applicant: FUNDACIÓN AZTI-AZTI FUNDAZIOA, Sukarrieta (ES)

(72) Inventors: Guzmán Díez Díez, Sukarrieta (ES); Gorka Gabiña Iribar, Sukarrieta (ES)

(73) Assignee: FUNDACIÓN AZTI—AZTI FUNDAZIOA, Sukarrieta (Vizcaya) (ES)

( * ) Notice: Subject to any disclaimer, the term of this patent is extended or adjusted under 35 U.S.C. 154(b) by 176 days.

(21) Appl. No.: 16/067,175

(22) PCT Filed: Dec. 29, 2015

(86) PCT No.: PCT/ES2015/070960
§ 371 (c)(1),
(2) Date: Dec. 12, 2018

(87) PCT Pub. No.: WO2017/114981
PCT Pub. Date: Jul. 6, 2017

(65) Prior Publication Data
US 2019/0093626 A1 Mar. 28, 2019

(51) Int. Cl.
*F03D 1/06* (2006.01)

(52) U.S. Cl.
CPC .............. *F03D 1/0633* (2013.01); *F03D 1/06* (2013.01); *F03D 1/0683* (2013.01);
(Continued)

(58) Field of Classification Search
CPC ........ F03D 1/0633; F03D 1/06; F03D 1/0683; Y02P 70/523; Y02E 10/721;
(Continued)

(56) References Cited

U.S. PATENT DOCUMENTS 6,431,498 B1 * 8/2002 Watts .................. B64C 3/10
244/198
8,535,008 B2 * 9/2013 Dewar ................. F03B 3/12
416/170 R
(Continued)

FOREIGN PATENT DOCUMENTS

GB 791563 3/1958

OTHER PUBLICATIONS

International Search Report for corresponding application PCT/ES2015/070960 filed Dec. 29, 2015; dated Mar. 17, 2016.
(Continued)

*Primary Examiner* — Eldon T Brockman
(74) *Attorney, Agent, or Firm* — Cantor Colburn LLP

(57) ABSTRACT

The invention relates to a method for producing or designing a leading edge of a lifting structure, wherein starting at the midpoint of the base (0,0), a curve is applied to the profile of the structure, the length "$L_1$" of which is according to the maximum thickness of the NACA section in the base of the profile "$H_0$" in the base and is defined by the equation $L_1=0.0510H_0^2-0.0790H_0+15.5790$, and the maximum height of which on the "x"-axis is located at point "$L_1/2$" and defined by means of the relationship $x=0.0137(L_1)^{1.4944}$, the shape of said curve being defined by means of the equation: $(y-y_0)=0.0000000107x^6+0.0000016382x^5-0.0000794412x^4+0.0010194142x^3+0.0097205322x^2+0.0136993913x$, and the rest of the curve being calculated by means of an iterative process according to the above.

3 Claims, 2 Drawing Sheets

(52) U.S. Cl.
CPC ......... *F05B 2240/30* (2013.01); *Y02E 10/721* (2013.01); *Y02P 70/523* (2015.11)

(58) Field of Classification Search
CPC .... F05B 2240/30; F05B 2200/00; B63B 1/00; B63B 32/60; B63B 3/38
See application file for complete search history.

(56) References Cited

U.S. PATENT DOCUMENTS

| | | | |
|---|---|---|---|
| 8,789,793 B2* | 7/2014 | Llamas Sandin | B64C 5/02 244/134 E |
| 9,249,666 B2* | 2/2016 | Wood | F04D 29/324 |
| 2011/0058955 A1* | 3/2011 | Jung | B64C 27/001 416/241 R |

OTHER PUBLICATIONS

Written Opinion of the International Searching Authority for corresponding application PCT/ES2015/070960 filed Dec. 29, 2015; dated Mar. 17, 2016.

* cited by examiner

METHOD FOR DESIGNING LEADING EDGES AND SUPPORTING STRUCTURE PROVIDED WITH SAID EDGE

FIELD OF THE ART

The invention relates to a method for designing leading edges which reduces the drag coefficient (resistance) in aero/hydrodynamic lifting structures by modifying only the profile of the structure (not the elevation). The invention also comprises different structures provided with said edge.

STATE OF THE ART

Reducing the drag coefficient in any lifting structure, even by a small proportion, can translate into significant reductions in power consumption, particularly in the sectors of aeronautics, maritime transport, and wind-power generation.

All lifting surfaces (wings, stabilizers, wind turbine blades) existing today have leading edges with a smooth conventional profile. There are some proposals for leading edges having aerodynamic advantages over smooth leading edges, such as the one disclosed in application EP1805412, optimized for wind turbine blades. This latter profile is designed with tubercle edges modifying the profile and the elevation of the leading edge, the complexity of which makes the production process more expensive.

Leading edges applicable to a variety of lifting structures are therefore required.

Object of the Invention

The method of the invention is based on correlating the number of curves applied to the profile with the span of the lifting structure and the width of the section thereof, using a polynomial function to define the shape of the curve.

The proposed edge has, on the contrary, a very simple morphology as it does not modify the elevation of the structure and is based on a specific profile curvature design adapted to each aero/hydrodynamic structure susceptible to modification.

The edge can be applied to aerodynamic structures (wings, wind turbine blades, stabilizers in airplanes, turbine vanes) or hydrodynamic structures (rudders, ship hulls, keels, etc.), since all these structures have a supporting profile similar to the one shown in FIG. 1.

According to the proposed invention, the method for designing a leading edge of a lifting structure comprises the following steps:

a. establishing a coordinate system with an "x"-axis in the base of the profile of the lifting structure and a "y"-axis orthogonal thereto and extending from the midpoint of the base of the profile to the vertex of the structure;

b. identifying the maximum thickness of the NACA (National Advisory Committee for Aeronautics) section in the base of the profile "$H_0$" and starting to modify the surface profile at point (0,0) by applying a curve, the length "$L_1$" of which, according to the maximum thickness "$H_0$" in the base, is defined by the equation $L_1=0.0510H_0^2-0.0790H_0+15.5790$, and the maximum height of which on the "x"-axis, which is located at point "$y_1/2$"-given that in this first segment $y_1=L_1$-, is defined by means of the relationship $x=0.0137(L_1)^{1.4944}$, the shape of said curve being defined by means of the equation: $(y-y_0)=0.0000000107x^6+0.0000016382x^5-0.0000794412x^4+0.0010194142x^3+0.0097205322x^2+0.0136993913x$, where $y_0=0$;

c. repeating step b using the thickness "$H_1$" of the profile at the height "$y_1$" to calculate the new length "$L_2$"—such that $y_2=L_1+L_2$-, the maximum height on the "x"-axis, which is located at point "$L_1+L_2/2$", being defined by means of the relationship $x=0.0137(L_2)^{1.4944}$, the shape of said curve being defined by means of the equation: $(y-y1)=0.0000000107x^6+0.0000016382x^5-0.0000794412x^4+0.0010194142x^3+0.0097205322x^2+0.0136993913x$; and so on and so forth. In the sense of the present description, to "modify" is understood as any step involving production, such as designing, modeling, surface working, etc.

The depth of impact "D" is understood as the distance measured from the leading edge of the profile with respect to the distance the morphology of the lifting structure is modified, where it is dynamically calculated from a maximum value at height y=0 to a value equal to zero at point "$y_{max}$". The maximum value of "D", i.e., "$D_0$", is in the range of 0.25% to 0.31% of the chord length of the first NACA section "$P_{max}$" of the structure to be modified. Said range is obtained from the most preferred "Pmax" value of 0.28% to which a correction factor of ±10% is applied.

BRIEF DESCRIPTION OF THE DRAWINGS

For the purpose of aiding to better understand the features of the invention according to a preferred practical embodiment thereof, the following description of a set of drawings in which the following has been depicted with an illustrative character is attached.

DETAILED DESCRIPTION OF THE INVENTION

The leading edge is designed in several iterative steps. First, a coordinate system is established with an "x"-axis in the base of the profile of the lifting structure and a "y"-axis orthogonal thereto and extending from the midpoint of the base of the profile to the vertex of the structure. The curve starts at point (0,0), the length "$L_1$" of which, according to the maximum thickness "$H_0$" in the base, is defined by the equation $L_1=0.0510H_0^2-0.0790H_0+15.5790$.

The shape of the curve is obtained by means of the equation:

$$(y-y_0)=0.0000000107x^6+0.0000016382x^5-0.0000794412x^4+0.0010194142x^3+0.0097205322x^2+0.0136993913x$$

such that $y_0=0$

The maximum height on the "x"-axis of said curve is reached at point "$y_1/2$" and has a value of $x=0.0137(L_1)^{1.4944}$.

This polynomial function is obtained from studying the caudal fins of sharks in 3D format with the help of Plot Digitizer software, obtaining the values of the points on the "x"-axis and "y"-axis of a graph from the image of the curve. The inventors then performed fitting with respect to the polynomial function which better assured a reduction in the coefficient of friction (see below).

Once the first segment of the curve has been calculated, the second one is calculated in a similar manner, where "$H_1$"

is the thickness of the profile at the height "$y_1$" at which the first curve ends, such that $L_2=0.0510H_1^2-0.0790H_1+15.5790$.

The shape of the curve being that indicated by the equation:

$$(y-y_1)=0.0000000107x^6+0.0000016382x^5-0.0000794412x^4+0.0010194142x^3+0.0097205322x^2+0.0136993913x$$

The maximum height on the "x"-axis in that second segment, which is reached at point "$L_1+L_2/2$", has a value of $x=0.0137(L_2)^{1.4944}$.

Figure 1:
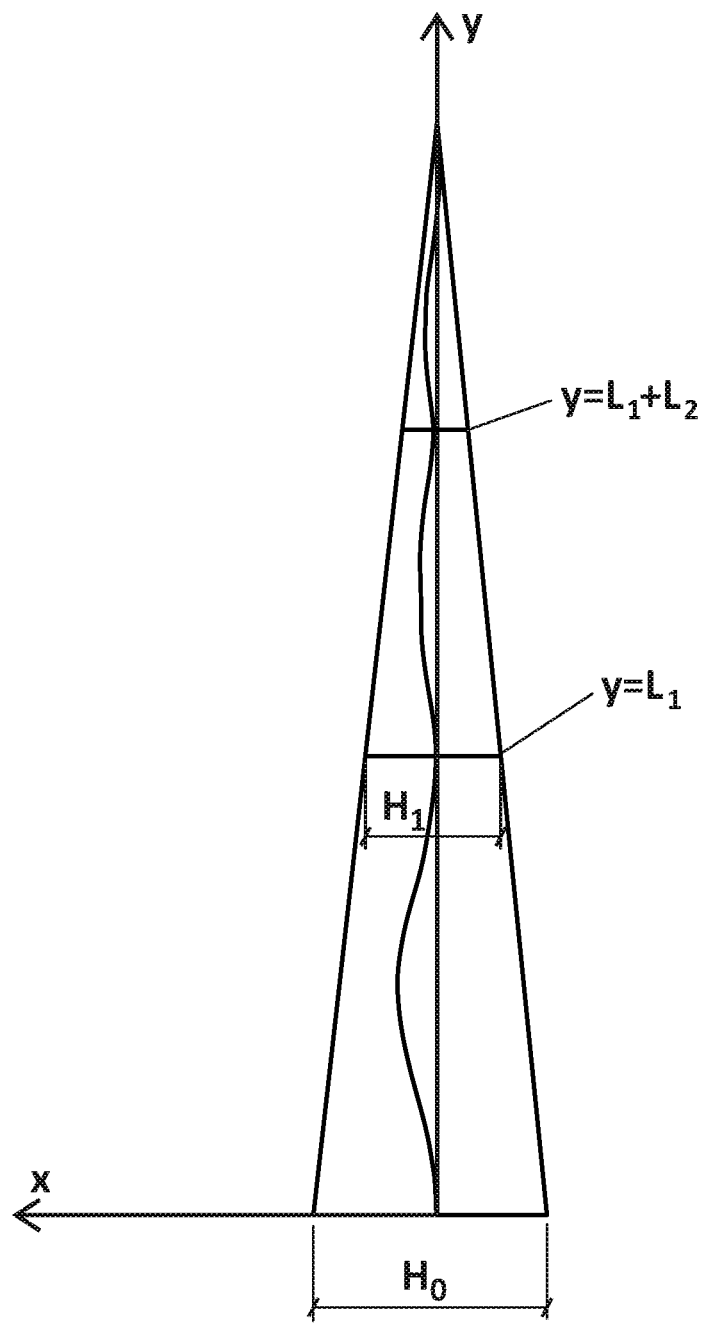
FIG. 1 is a depiction of the profile of the lifting surface and the initial reference points (coordinates) for defining the first and successive curves that define the leading edge of this model.
Figure 2:
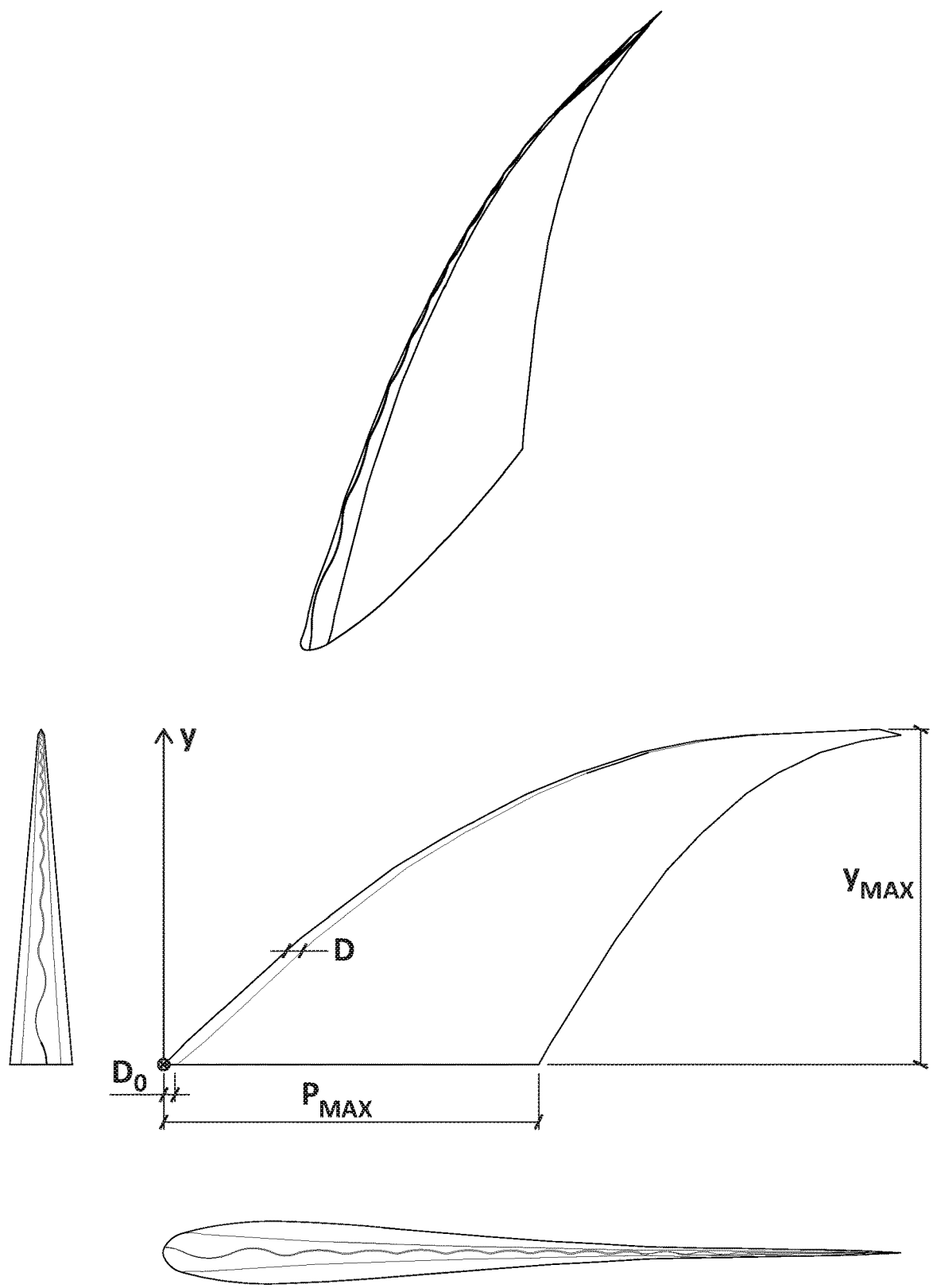
FIG. 2 shows the profile, elevational, perspective, and side views of a surface according to the invention.

As can be seen in FIG. 2, the elevation of the lifting structure is not modified, although a transverse sectioning thereof will obviously show the difference in depth between different segments.

The depth of impact "D" measured with respect to the leading edge of the profile is dynamically calculated from a maximum value at point y=0 to a value equal to zero at point "$y_{max}$". The maximum value of "D", i.e., "$D_0$", is in the range of 0.25% to 0.31% of the chord length of the first NACA section "$P_{max}$" of the structure to be modified. Said range is obtained from the most preferred "Pmax" value of 0.28% to which a correction factor of ±10% is applied.

The edge is scalable to any size and can be applied to airborne or waterborne lifting structures.

In the experimental results shown below, the edge of the invention applied to a hydrodynamic stabilizer has shown a reduction in the drag coefficient of 1% compared with an identical model with the smooth leading edge (see Table 1 below).

The hydrodynamic efficiency of the models has been evaluated as follows: a model with an edge according to the aforementioned invention and a model with a smooth edge were reconstructed by means of software. Next, by means of a computational fluid dynamics (CFD) analysis using the ANSYS Fluent software, the drag coefficients (Cd), velocity field, and pressures were compared with the surface the leading edge of which is smooth. The comparison was carried out for two velocities (2 and 5 m/s) and three different angles of attack (0°, 15°, and 45°).

To that end, the CAD file of the hydrodynamic stabilizer was supplied in the IGS/STEP format and the CFD model was generated based on said file. The CAD of the geometry was also supplied in the same format with the smooth leading edge.

The study conditions were first established, defining: a) the geometry of the virtual control volume in which analyses were performed (7 meters long, 3 meters wide, and 1.5 meters tall; b) the most suitable meshing characteristics to be used in the models. In this last case, a mesh sensitivity analysis was included for selecting the ideal number of cells for the purpose of optimizing computational effort.

Thereafter, a layer of cells was established around the hydrodynamic stabilizer which allows capturing the boundary layer around same (with special care in the area of the leading edge) and moderate mesh growth towards the outside was then applied.

Three parameters were analyzed for the influence thereof on the drag coefficient "Cd": the velocity, the angle of attack, and the profile of the leading edge.

The drag coefficient is defined as:

$$C_d = \frac{2F_d}{\rho \cdot u_{aux}^2 \cdot A}$$

where "F" is the force component in the direction of the flow velocity; "$\rho$" is the fluid density, "u" is the flow velocity, and "A" is the reference surface which, for submerged hydrodynamic bodies, is the surface in contact with the fluid.

The results of the CFD analysis indicate that the proposed leading edge has a smaller drag coefficient than its smooth counterpart in all the studied configurations and that the average reduction in the resistance of the leading model with a curved edge is 1.1%. Table 1 shows the percentage of reduction in the drag coefficient (Cd) of the stabilizer with a curved profile with respect to the wing with a smooth profile (1−(Cd of curved profile/Cd of smooth profile)×100) in the different cases of study: two velocities (2 and 5 m/s) and three different angles of attack (0°, 15°, and 45°).

| | | Angle | | |
|---|---|---|---|---|
| | v (m/s) | 0° | 15° | 45° |
| 1 − (Cd of curved profile/Cd of smooth profile) × 100 | 2 | 3.7% | 1.0% | 0.6% |
| | 5 | 0.2% | 0.9% | 0.2% |

On the other hand, the velocity fields for the type of curved profile are also more developed and have less impact on the downstream flow than in the case of a smooth profile.

The invention claimed is:

1. A method for producing or designing a leading edge of a lifting structure, the method including the following steps:

a. establishing a coordinate system with an "x"-axis in the base of the profile of the lifting structure and a "y"-axis orthogonal thereto and extending from the midpoint of the base to the vertex of the structure b. identifying a maximum thickness of a National Advisory Committee for Aeronautics (NACA) section in the base of the profile "$H_0$" and starting to modify the surface profile at coordinate (0,0) by applying a curve, the length "$L_1$" of which, according to the maximum thickness "$H_0$" in the base, is defined by the equation $L_1=0.0510H_0^2-0.0790H_0+15.5790$, and the maximum height of which on the "x"-axis, which is located at point "$y_1/2$", is defined by means of the relationship $x=0.0137(L_1)^{1.4944}$, the shape of said curve being defined by means of the equation: $(y-y_0)=0.0000000107x^6+0.0000016382x^5-0.0000794412x^4+0.0010194142x^3+0.0097205322x^2+0.0136993913x$, c. repeating step b using the thickness "$H_1$" of the profile at the height "$y_1$" to calculate the new length "$L_2$"—such that $y_2=L_1+L_2$-, the maximum height on the "x"-axis, which is located at point "$L_1+L_2/2$", being defined by means of the relationship $x=0.0137(L_2)^{1.4944}$, the shape of said curve being defined by means of the equation: $(y-y1)=0.0000000107x^6+0.0000016382x^5-0.0000794412x^4+0.0010194142x^3+0.0097205322x^2+0.0136993913x$, and d. repeating step b for additional segments.

2. The method for producing or designing a leading edge of a lifting structure according to claim 1, wherein a depth of impact "D", calculated from the leading edge of the profile, ranges from a maximum value at point y=0 to a value equal to zero at point "$y_{max}$"; and wherein "$D_0$" is in the range of 0.25% to 0.31% of the chord length of a first NACA section "$P_{max}$" of the structure to be modified.

3. Aero/hydrodynamic lifting structure provided with a leading edge designed according to claim 1.

\* \* \* \* \*